Sept. 13, 1966 D. RUBENSTEIN 3,271,917
REINFORCED PLASTIC CONSTRUCTIONS
Original Filed June 12, 1959

INVENTOR.
BY David Rubenstein

United States Patent Office 3,271,917
Patented Sept. 13, 1966

3,271,917
REINFORCED PLASTIC CONSTRUCTIONS
David Rubenstein, 2750 2nd Ave., San Diego, Calif.
Original application June 12, 1959, Ser. No. 820,067.
Divided and this application May 4, 1965, Ser.
No. 453,127
14 Claims. (Cl. 52—309)

This patent application is a division of my pending patent application Serial No. 820,067, filed June 12, 1959, now abandoned.

This invention relates to fiber and metal reinforced plastic constructions comprising structural and decorative-structural plastic laminated constructions.

An object of my invention is to provide members for constructions having structural reinforcement properties and uses and which may in the same construction provide decorative-structural embodiments and features.

Another object of my invention is to provide discrete combinations of metallic and non-metallic fibrous reinforcements embedded in plastic resin compositions or in elastomeric resinous or rubbery compositions or in rubber, both natural and synthetic rubber compositions, or in any combination of resin, elastomer or rubber materials available and adapted to specific uses in this invention.

Another object of my invention is to provide and produce a laminated layer construction of discrete and substantial stiffness having features designed for resistance to bending easily but which can be preformed and bent into shapes, rounds, squares, T-sections, Z-sections, U-sections so that said laminated layer construction is in and of itself when cured into a set plastic construction, a complete construction or a component of a construction as a bonded integral layer surface construction layer, or exposed and bonded part thereof.

Another object of my invention is to make mass-produced-compounded and ready-for-use materials adapted (to be provided on a reel-unit and to be unrolled as used in manufacture) for use in conventional molding apparatus, presses and dies, or for use in laminating equipment adapted for making flat or shaped constructions in molding apparatus of any type adaptable, as e.g., apparatus to make vessels or tanks, car bodies or car parts, truck cabs, scientific deep sea apparatus, articles of manufacture, or in connection with the several other inventions either in issued patents or disclosed and claimed in copending applications, the preformed forms and shapes for making embodiments of my said inventions in prestressed-preloaded and prestressed concrete and masonry constructions.

Another object of my invention is to make a line of products having style, color, and form and which may be smooth surfaced, or textured, or ribbed, or patterned, of decorative nature and having any discrete improvements on their surface or in the surface layer wherein such products may be provided having organic or inorganic fibers providing decorative qualities, or metal wire, screens, strands, rods or sheets, either plain or perforated sheets providing decorative qualities, said fibers and said metal embodiments being embedded in plastic compositions which may be colored, or white or black, or multi-colored, and having said color provided by pigments, mineral colors, particles, fillers and/or aggregates, dyes or any other known coloring means.

Another object of the invention is to make embodiments having structural features wherein prestressed preload is induced for permanent retention in the end product by chemical means as e.g. the chemical means of a polymerization reaction of thermosetting resins, elastomers or rubbery compositions, said chemical means as used alone or in combination with mechanical means or thermal means, or of any of said means together.

Another object of my invention is to make preforms of ready-to-polymerize plastic resinous compositions having both fibrous and metal reinforcement shaped to act as forms for concrete poured in-situ and when the concrete is cured said preforms are capable of being integrated, combined and bonded to said concrete as permanent reinforcement thereof.

Another object of my invention is to provide structural and decorative-structural materials in preformed and ready-for-final end use in building and bridge construction, engineering constructions, pipe lines or structures in conformity with the other stated objects herein given which shall provide an improved shock-absorbing, shock-resisting articulated mat or reinforcement covering construction for reinforced concrete construction, prestressed concrete, precast concrete, precast-prestressed concrete, concrete blocks, concrete panels, floors or walls or roofs, which construction shall have an improved resistant but resiliently and yieldingly resistant shock-absorbing action and improved means for bonding this covering construction to and with supporting forms.

In prior applications, I have disclosed and claimed high strength structural elements and the method of making them in which a concrete block or masonry or other stone-like or porous structural material structure is provided with a high tensile strength surface layer integrally bonded into, on and of the concrete; and specifically, I have disclosed the use of plastic compositions reinforced with fiber glass or other high tensile strength fibers in woven or unwoven mat form, strands, roving, tapes, fabrics, etc., and which I have also disclosed being used in combination with metal wires, rods, bars, sheets, etc., and/or with bulk-fillers as components of said plastic compositions.

In the present application for invention the feature of the combination of fibrous materials and metallic materials embedded in plastic resinous composition, elastomeric composition or rubber-like composition wherein the forces of shrinkage and expansion as occur in e.g., a polymerization reaction or other chemical reaction wherein a plastic composition converts from a fluid, or semi-fluid, or paste state, or converts from a solid state through a fluid state, or semi-fluid state, to a thermoset solid, or chemically-set irreversible solid state by means of the heat of the reaction, or by means of separately induced heat, or by means of a combination of the two heats, provides means to prestress preload the said fibrous materials and the said metallic materials in a balanced design related to the particular coefficients of expansion and contraction such materials inherently possess. In specific constructions at least two materials of fiber and metal are required but frequently more than one type of fibrous material is provided, e.g., long longitudinal fibers and chopped strands or fibers, or woven or non-woven fibrous constructions used in combination with metallic wires, screens, bars, rods, plain or perforated sheets in a designed structurally engineered relationship. The metallic materials are selected for their coefficients of expansion which usually but not always are of a relatively high thermal expansion whose coefficient of expansion is greater than the plastic resin composition selectively used. The metallic materials are expanded by heat as e.g., the heat generated in a polymerization reaction and called exothermic heat, and while the reaction is in progress, a plastic resin composition undergoing action toward e.g., a thermosetting state will first expand to a lesser extent than the metal after which the plastic resin composition in the conversion to a solid state, will shrink with resultant induced forced internal stress in and to the metallic material and the materials of a specific lamination of composite materials. The plastic resin composition contracts on polymerization under heat at the same time that the metallic materials are being expanded, and when the polymerization reaction is complete, embed and close around with a grabbing action, the said reinforcing materials. The force system so generated maintains the reinforcing materials, e.g., longitudinal wires or woven mesh of metal made as a combination reinforcement with woven fiber glass strands therethrough said wires, under internal stress or internal tension after the polymerization reaction has been completed and the composition of the product has returned to ambient temperature or to a predetermined temperature, which in this cooled state comprises a rigid or discretely toughened high strength product.

Surprisingly, as disclosed in my prior copending applications and in my Patent No. 2,850,890 the force systems induced by the chemical reaction of e.g., polymerization, provide prestressed preloaded structures. To most advantageously use such constructions making use of the combined features inherently found in reinforced plastics and metallic reinforcement the combination of such materials requires materials having features of high coefficients of expansion by thermal means and may include steel, stainless steel, iron, aluminum, copper, brass, nickel, metal alloys, and may include rare metals in such alloys, or the like. These metals are used in fiber form, or as wires, or woven fibers or woven wires, or rods and made into screens or fabrics or woven wire reinforcement, as e.g., concrete wire reinforcing or are used as longitudinal reinforcement as e.g., prestressing wires, rods, cables and sleeves of any guage wire or rod or bar adapted to a specific embodiment. Woven materials may be of a type wherein the advantageously placed strengths are obtained by correlated designed woof and warp fibers or strands of e.g., longitudinal fiber glass roving interwoven into a mesh screen wire or wherein a woven fiber glass roving is interwoven with longitudinal prestressing type wire strands or cables. Such a construction may have other longitudinal reinforcing metallic materials comprised of sheets, bands, strips, tapes, sleeves, rods, either deformed or plain, or circular rings or ellipical rings, etc. or the like. The balanced design for the entire structure is the criteria and materials are selected depending upon the directions of stresses and opposing forces desired and the design conditions to be met in placing such a structure to beneficial use. Pre-tensioning as disclosed in my prior copending applications and as known in the art, or post-tensioning of the metallic or fibrous materials or both may provide prestressed preload induced to augment the chemicallly induced force systems provided by the plastic resinous compositions, i.e., of the embedding compositions, and such prestressed preload captured premanently into the metallic and non-metallic fibrous reinforcing materials.

The fibrous material comprising the non-metallic reinforcement is selected for its compatible characteristics in use and to predetermined capabilities in maintaining structural integrity under heat of the polymerization reaction or other induced heat or chemical environment. The fibrous materials may be selected or combined, e.g. fiber glass fiber, Refrasil, Fibrafrax, (ceramic fibers of silicas) sisal, hemp, cotton, nylon, rayon, burlap, rubber, synthetic rubber, fuzed quartz, fuzed volcanic fibers, ceramic fibers, or any combination of them. Synthetic fibers of polythylene terephthlates (Terylene, Dacron or Mylar), acrylic fibers of the type of Orlon, Dynel, which alone or together with fiber glass provide superior high strength constructions when laminated into embodiments of the invention. In making fire resistive constructions asbestos fiber, ceramic fibers or Fibrafrax interwoven into the embodiments of the invention provide high yield strengths for the reinforcements at elevated temperatures, i.e., when heat resistive plastic resins or plastics are used. By predetermined design, the rate of char of surface of any one embodiment formulation can be controlled so that effective strengths of such a construction can be used for a predetermined period.

As shown in my copending application Serial No. 345,084, the features of winding fibrous strands like e.g., fiber glass roving, nylon rope, etc., in a continuous wind at a predetermined tension provides a uniform cross sectional strength to a plurality of such fibers. Such a construction may be wound with wire such as the heating wires shown in prior disclosure in e.g., Patent No. 2,671,158 or steel reinforcing as shown in Serial No. 210,803 filed February 14, 1951, now abandoned as the specification but not as to the inventions disclosed therein. The wire may be of multi-purpose uses and used to both strengthen such a construction and provide the resistance heating embodiments shown in said Patent No. 2,671,158. In the mass production of such constructions, hand lay-up or field build-up of such reinforcement is a laborious and time consuming process. By weaving in a loom or on apparatus specifically designed for such weaving, the manufacture of composite reinforcement is substantially improved as to its integrity for its use as a strengthening reinforcement and is manufactured at a much lower cost. In addition a woven fabric or an assembled construction wherein the metallic materials provide support for the more fragile non-metallic fibers, e.g., fiber glass strands or mats, are found to be much more easier formed into preformed shapes for manufacture into end product. Wire can be as stiff as needed while fiber glass strands before impregnation and becoming a constituent of a reinforced fiber glass product are fragile and have little or no strength in shear. An interwoven product provides both properties in one embodiment and the materials protect each other. Predetermined balanced designed constructions of reinforcing materials mixed in discrete amounts, or interwoven, or laminated, or introduced in specific portions and not in others of a specific construction, or integrated into a unitary reinforcement, e.g., fiber glass fibers of roving woven on a loom with aluminum wires, or wire mesh screen interwoven with synthetic fibers, or inorganic fibers, or organic fibers or even bamboo strips, or expanded mesh metal sheet layered with woven roving, or a cloth of composite fibers and wires, or prestressing wire or cable interwoven with woven roving, etc., all are useful embodiments to this invention, but obviously such disclosure is not the limit of this invention because other combinations of materials are available or are known to be adaptable to the art herein disclosed.

The various known types of weaving apparatus may be used or adapted to use in the manufacture of the various embodiments of such reinforcement materials, or the said embodiments are made on apparatus disclosed in my prior applications. In making a balanced designed ready-for-use reinforcing material, it is vital to design for its fabrication in use. Conventional or apparatus of my invention as presses, dies, or molding apparatus may be adequate for final and product manufacture, but care in overall design and selection of the metal type die, or mold, epoxy resin mold, or preforming machine used ahead of final manufacture will provide the best quality end product. Metals vary in the degree of ductility and bending to shapes requires careful study of this feature. Sharp bends, clean arrises, rounded corners, reverse bends, compound curves, spheres or spherical shapes, curved shaped bodies, etc., all will be made if balanced design of the material is had.

The weaving or assembly of the constituent fibers and metallic materials is definitely variable and the selection of directional fibers, e.g., woof fibers and warp metal wires so that with care, many conventional constructions may be made on any conventional preform machinery and advantageously may be processed in conventional molds. However, in certain embodiments lower costs attained come from total design of product and process. Varied strength requirements in the same piece at different parts thereof can be advantageously made wherein the correct amount and no more of a specific reinforcement is used to its best use. In certain embodiments organic and inorganic fibers may be pre-coated or impregnated and woven after treatment. The combined materials may be, and are, in certain embodiments, run through an impregnating vat, or may be roller coated, or dipped, or sprayed or may be made on spray-spinning machines and by techniques disclosed by me in Serial No. 229,852 filed June 4, 1951, a portion of which is now Patent No. 2,850,890. The total design includes consideration of the stresses induced in processing so that polymerization stress induction does not become unbalanced and make warped or unduly stressed embodiments. The art of structural engineering and materials engineering work hand in glove with the art of chemical engineering in the manufacture of the products of the instant invention. Composite constructions in a ready-for-use state made in long rolls as e.g., reinforcing longitudinal materials like wires and longitudinal roving strands woven or integrated or interspersed into multi-directional reinforcement as by weaving, can be further semi-finished by laminating fiber glass mat or sisal mat or fibers or be "spray-spun" with fibers, e.g., fiber glass fibers, or acrylic fibers in a spray-spinning applied layer of plastic resin composition which embeds the fibers as they are sprayed-spun into place or into a laminated layer or covering over or about or embedding the reinforcing longitudinal materials. The spray-spinning method and the products made are well disclosed and claimed in prior applications including Serial No. 229,852 a portion of which is now Patent No. 2,850,890 and Serial No. 340,642 a portion of which is now Patent No. 2,951,006 and also in Serial No. 345,084. The sprayed-spun product may have random short or long fibers or may be product comprising combinations of gravity placed or vacuum placed or pressure placed short fibers or long fibers used in integrating a ready-for-use longitudinally reinforced packaged construction wherein the metal wires or other metal reinforcement provides strength for handling, shipping and processing and which metal reinforcement also is a permanent component in the manufacture of the ready-for-use materials in its final end use.

Such constructions may be partially cured preimpregnated laminated layers having resinous compositions which will be stable in this state for predetermined period of time, and which upon pressure and elevated temperature as in a platen heated press, will be cured into a thermoset cured product. Such constructions are made in accordance with the disclosures and claims of Serial No. 340,642 a portion of which is now Patent No. 2,951,006 and provided in a reel-unit ready-for-use on site, or in a factory, or in a process. Any type of pressure, e.g., weight of the product, vacuum pressure, air pressure, fluid pressure, mechanical pressure, roller pressure, weights applied, or in fact any known means including vacuum bag molding or conventional laminating presses or the apparatus disclosed and claimed in my copending applications can be used. Because of the ability of the products of the instant invention to be easily preformed by reason of the metal wires or other metal components, preforming of semi-finished partially cured packaged constructions which if having phenolic or epoxy resins or any other resin or elastomer or rubber materials in conformity with the disclosure of my prior copending applications which semi-finished or preimpregnated fiber-glass or other fibrous material is known in the art as "B-Stage Material," can be done in a factory on a production line or can be done in the field on site and thus provide embodiments of the instant invention.

If the materials are provided in a ready-for-use state as a packaged product they are made and used in the manner of products and methods of using of said products as is disclosed in my copending applications including Serial No. 340,642 and a portion of which is now Patent No. 2,951,006, and Serial No. 345,084.

The resins, elastomers and rubber-like materials that are useful in the present invention, but in no way limited to those herein mentioned, comprise resins, elastomers and rubber-like materials which advantageously have high shrinkage after preliminary setting and either should have extraordinarily high adhesive bond strength or should have high strengths adapted to capture and retain induced prestressed preloads provided by any means as permanent internal stress in embodiments of the invention. Combinations of resinous materials which always include a thermosetting resin material may be used as binders, adhesives and laminating plastic compositions.

Such materials may be exampled by the following materials, but obviously, the cited examples are not limiting or limit the materials useful in the invention. The art of resins, elastomers and rubbers is in a very rapid state of development and improvements are appearing very frequently in older materials as well as in entirely new materials made from older basic materials, etc., and the knowledge of the art of resins, elastomers and rubber-like materials compounding is used in its known art and in the art disclosed in this invention and copending applications.

Particularly useful resins are the many types of polyester resins, e.g., unsaturated polyester resin compositions which may be rigid resins or may be flexible resins or may be compatible compositions of rigid and flexible resin compositions adapted to narrow or wide filler ratios and adapted to controlled strengths of body in set polymerized products. They may be tough, rubbery resins and may contain monomers copolymerizable with the polyesters of the said resins such as vinyl monomers, styrene monomer, vinyl toluene, unsaturated hydrocarbon monomer, methyl methacrylate monomer, triallyl cyanurate monomer, vinyl acetate, etc., and others as known in the art. Polyester resins comprise resin formed by the reaction between a dibasic acid and a dihydroxy alcohol, both organic. Modification with multi-functional acids and/or bases and some unsaturated reactants permit crosslinking to thermosetting resins. Polyesters modified with fatty acid are called alkyds.

Precast concrete grilles as hereinafter described as portions of masonry walls make beneficial use of discretely patterned open cell masonry units having on their surface or inbetween two or more elements, laminated layers of fiber glass reinforced plastics having metal screen wire of substantial strength as a component of the lamination. Such a product provides both a wall and a decorative medium having a source of light therethrough when I use clear water-white polyester resin compositions or other resin compositions, e.g., acrylic or epoxy resins. The metal screen can be selected to provide a distinctive architectural design and be useful in e.g., church windows, grilles and even decorative panels. Tinted and dyed translucent polyester resin reinforced with fiber glass allows full play to creative architectural design in such products. Other beneficial uses in buildings and in articles of manufacture obviously can be made, not only for wire mesh screens reinforced laminations but for metallic or metallic wire embodiments laminated onto or inbetween supporting elements. These embodiments afford low maintenance constructions because no exposed metal is in the end product and are particularly beneficial in salt air environments, or other metal corrosive atmospheres. Polyester resins containing methyl methacrylate are excellent resins in this use.

Acrylic sirup resins as made by E. I. du Pont de Nemours & Co., Inc., of Wilmington, Delaware, are particularly useful resin compositions for such embodiments of the invention. Acrylic resin is a synthetic resin prepared from acrylic acid or from a derivative of acrylic acid.

Epoxy resins are particularly useful because of high strength features and are made based on ethylene oxide, its derivatives or homologs wherein epoxy resins form straight-chain thermoplastics and thermosetting resins, e.g., by the condensation of bisphenol and epichlorohydrin. Epoxy resins are available in amber colored resins or in water-white resins. One water-white resin is the monomeric ether of bisphenol-A rather than a conventional mixture of polymers. Many cross-linking resins, curing agents and monomers are available and are known in the art. Epoxy-polysulphide (Thiokol) resins and compositions are useful materials.

Other resins which are thermosetting types of resins include, but are in no way limited to the following resins useful in the instant invention, phenol resins, phenol-aldehyde resins, phenolic resins, silicone resins, melamine resins, phenol-formaldehyde, urea formaldehyde resins, polybasic acid-glycerol unsaturated polyester resins, and compatible compositions of one or more of said resins are found useful to the art. The known means of using resins provided in the art of such resin compounding is a wide and extensive art and all resins of any particular class are not always useful in and by themselves but compatible mixtures and compounding can provide the thermosetting, high strength resin compositions useful in the invention. This is well disclosed in my prior applications.

In the manufacture of polyester resins, e.g., unsaturated polyester resins, properties are tailored for specific uses from selection and use of basic materials as e.g., fumaric acid, maleic acid, adipic acid, maleic anhydride, ethylene glycol, neopentyl glycol, trimethylene glycol, propylene glycol, aconitic acid, endomethylene tetrahydrophthalic acid from cyclopentadiene, hexachloroendo-methylene tetrahydrophthalic acid from hexachlorocyclopentadiene, isophthalic acid, terephthalic acid, phthalic anhydride, etc., styrene monomer, vinyl monomers. Catalysts as e.g., benzoyl peroxide, methyl ethyl ketone peroxide, benzoyl peroxide in tricresyl phosphate, methyl ethyl ketone peroxide in dimethyl phthalate, etc., may be used in the "tailored compositions" and is well disclosed in the parent application, and in my copending application Serial No. 734,464 filed June 20, 1958, now U.S. Patent No. 3,111,569 as a continuation-in-part to my Serial No. 345,084.

While it is known that heat alone will polymerize plastic resin compositions generally, it is best to use catalysts in order to make economical manufacture. Light rays, radiation and other means are known in the art and in specific instances are used to cure resin compositions. In the use of benzoyl peroxide catalysts and in some others known in the art, cobalt naphthenate and cobalt octoate, or other promoters or accelerators are useful ingredients, and in the polymerization of polyester resin compositions on site in ready-for-use or otherwise used compositions provide a polymerization means which can be accomplished without external heat being applied to the construction. Air-setting-temperature compositions of such resins can be and are used in making specific embodiments. In spray-spinning and spray gun techniques and processes in the invention such air-setting plastic resins are particularly useful. Special catalyst guns like those made by Binks Mfg. Co. or DeVilbiss manufacture or fiber-resin-catalyst guns and devices as shown in my application Serial No. 229,852 a portion of which is now Patent No. 2,850,890 and Serial No. 340,642 a portion of which is now Patent No. 2,951,006 and in the parent application Serial No. 345,084 or as made by the Rand Corporation may be employed in making embodiments of the invention. The heat of the reaction during the polymerization of the plastic resin composition furnishes heat by which the metal, e.g., aluminum wire mesh, is expanded so that this reinforcement as embedded in the plastic resin composition, e.g., an unsaturated polyester resin composition of blended rigid and flexible unsaturated polyester resins, will be placed in prestressed preload, e.g., in tension or in a state of complex stresses by the shrinkage forces derived by the shrinking during polymerization of the said unsaturated polyester resin composition. As known in the art such shrinkage can be e.g., 2%, 5%, 7% or even more depending upon the tailored mixture of resins, there being no limitation intended in these percentages as they are given for example only, the shrinkage or condensation of the products in their volume being a function of the structural design of the product. Such forces are controllable and well adapted to engineering calculation by known means and art. The beneficial use of woven laminated combinations of metallic reinforcement and fibrous reinforcement e.g., fiber glass roving, provides by the instant invention valuable engineering materials adapted to very precise quality control in the manufacture of prefabricated ready-for-use materials, and of semi-finished laminated layers of integrated and interwoven metallic and fibrous reinforcements, which, when used in final end use provide a uniformity of product of a thoroughly engineered nature and relatively low in cost for the reliability and product quality provided. The sloppy, sticky, and wasteful hand-lay-up methods of making reinforced plastics is overcome by supporting the elements of such reinforced plastics on and with metallic wire, e.g., aluminum wire, stainless steel screen, or any other desired adaptable metal product providing component features. As disclosed and claimed in my prior applications and in my Patent No. 2,671,158 such metallic components are useful to many embodiments as resistance materials adapted to provide heat for the on-site polymerization of such constructions.

The art of resin manufacture contains means to stabilize resins both in their fluid or pre-use state and when made up into preimpregnated constructions. Examples of such materials are disclosed in my copending applications, and in the case of polyester resin compositions, such materials like quaternary ammonium salts, salts of substituted hydrazines and the like, including substituted parabenzoquinines are used in the art. Inhibitors which stabilize resins at room temperature and yet permit fast and complete cure at molding temperatures are generally preferred over retardants in that they give a longer "storage life," a longer "bench life" or a longer "pot life" for catalyzed unsaturated polyester resin compositions. Two main types of agents serve as inhibitors for polyester resins, "retardants" wherein their inhibiting effect is directly proportional to their concentration in the polyester resin, and "stabilizers" wherein these materials "retard" at one temperature and permit fast-cure cycles at another temperature. Generally "stabilizers" lose their inhibiting effects and properties at higher temperatures and are very useful in "preimpregnated resin-fiber glass-metal laminating materials" in a ready-for-use state. These features of resin use and compounding are well disclosed in my copending application Serial No. 668,285 filed June 25, 1957 as a continuation-in-part to my application Serial No. 229,852 filed June 4, 1951, a portion of which is now Patent No. 2,850,890.

In catalyst systems "initiators" and "accelerators" or "promoters" can be and are used. Such materials are exampled by, but in no way are intended to limit any materials found in the art or found useful in the invention within its scope, which materials e.g., are the various benzoyl peroxides known in the art, tertiary butyl catechol, cobalt naphthenate, other cobalt derivatives, tertiary butyl perbenzoate, and proprietary manufactured formulations known in the art and whose composition is not a matter of public record.

Fire retardant properties, self-extinguishing properties, and low or no flame spread properties all are desirable features and are provided by the resins having such properties or may be provided by additives such as Chlorowax 70, a 70% chlorine containing chlorinated paraffin as made by the Diamond Alkali Company, Painsville, Ohio, and by antimony dioxide ($Sb_2O_3$) in proportions of 10% to 12.5% of Chlorowax 70 and 5% to 10% of $Sb_2O_3$, but not limited to these proportions by weight on the resin.

Other materials provide fire resistive qualities including triallyl cyanurate, chlorinated aromatic dicarboxylic acids, such as tetrachlorophthalic acid, hexachlorosndomethylene tetraphthalic acid which contains over 50% stable chlorine, fluorine compounds, bromine compounds, and phosonate compounds.

Many fillers as bulk-fillers are useful in the present invention and include silica powders, sand, precipated calcium carbonate, complex calcium carbonate, mica, ground minerals, crushed minerals and rocks and aggregates, tailings from sand washing operations, cement, pumice, volcanic particles and aggregates, aluminum silicates, magnesium silicates, diatomaceous earth, clay, silt, mine dump tailings, and many more filler materials as disclosed in my copending applications are used in the instant applications' products. Thrixotropic properties are imparted to resin compositions by Cabosil, a colloidal silica, or Santocal, or Bentone 34, certain bentonite clays, sands, or discrete particles as is disclosed in the art and in my copending application and patents of issue.

In making the various fiber glass or other fibrous embodiments, sizing or temperature adaptable coatings or finishes are desired when full strength features and good bond is wanted between fiber glass and resin composition. If starch or other sizing is on the fibers as received, certain uses require their removal by heat or chemical treatment, e.g., heating to from about 250° F. to just under the deformation temperature may be employed in treating glass fibers.

Frequently, specific sizing like vinyl chlorosilane coating or chromic acid coating like those well known in the art are quite adequate, but pretreatment of roving like preimpregnating the roving in an epoxy resin composition and making it a "B"-staged material before weaving or laminating or combining fiber glass roving proves very advantageous and practical. Such an epoxy resin composition coated roving provides a very high strength material and can be used in polyester resin compositions or other compatible resin compositions. Metals also require some sizing depending upon the metal being used. Aluminum in most polyester resin compositions in and of itself provides an excellent bond strength. Epoxy resin compositions having polysulphide rubber (Thiokol) make excellent bond to concrete and metals, and advantageously includes epoxy-polyamide compositions. In the knowlnesium silicates, diatomaceous earth, clay, silt, mine dump resin contamination which may orginate by means provided by metal contact or by corrosive or corrosion features of metals. Rust on steel is customarily removed by an acid wash followed by a clear water wash, then thoroughly drying. Concrete may have a high alkalinity which may be counter-acted by a muriatic acid wash and removal thereof by water wash.

Heat as a component of the process of manufacture is provided by any known means, e.g., by ovens, heated platens, blankets, induction heating, convection heating, radiant heating, gas heat, electric heat, or chemical generated heat and may be employed to individual components such as wires to provide a prestressed preload as internal stress prior to incorporation into laminated constructions or is induced into such wire components or metal components during processing or may purposefully be provided as sensible heat in measured and predetermined amounts for specific formulated times during processing. Generally, sensible heat is desired in mass-production of the products. It is substantially precisely controllable and makes for accurate curing times and temperatures. Radiant heaters, infra-red heating, high frequency dielectric or resistance heating apparatus is useful and used. Sun heat, hot sand, or any other available means can be used; i.e., in certain specific embodiments.

Depending upon the products being made, pressure is used as a component of the formulation and is the pressure of the weight of the material itself or is induced pressure as from a press or roller or weight. Pressure and heat in discrete amounts are purposefully designed to afford specific formulated mass-production techniques in making the various embodiments of the invention. However, ambient systems of curing also are useful curing systems and are used along or of and with other systems. Ambient systems of curing may be used wherein the portion of a product or all of a product may be enclosed in a shrinkable envelope, e.g., cellophane or other envelope as disclosed and claimed in my copending application Serial No. 734,464, and in the parent application Serial No. 345,084, and an amount of internal stress derived into a product by the shrinkage forces of such an envelope or means. This is particularly advantageous in making products having a closed boundary, e.g., pipe, circular vessels, spheres, or any other specific configuration having a closed boundary. In the various embodiments including those of closed boundary surfaces, the cross-sections of the wall of the product can be of one, two, three, four or any number of plies and may be continuous plies or partial plies applied in relation to a predetermined system or design of laminated layering. The plies may all be those containing metal reinforcements of the invention or they may be alternate or spaced plies having discrete structural engineering or other desired properties provided by non-metallic laminating layers interspersed with metallic reinforced laminating layers. Decorative embodiments may be in a layer or layers and structural embodiments in the same layer or layers or in different layer or layers.

The polymerization of thermosetting resins generally induces heat and such heat must be reckoned with in the total design of a product. Metallic wires, mesh, prestressed reinforcing steel, aluminum wire or metal reinforcements, or any other metallic embodiment has a known coefficient of expansion and a known temperature at which desirable properties are captured or at which such expansion could be dissipated. The total design of the end product of the invention requires consideration in the light of the art and in the light of chemical engineering, structural engineering and materials engineering design including esthetics for architectural purposes or design purposes, of the inherent characteristics of the materials so that e.g., temper or strength is not lost or properties changed adversely by portions of a process or by inadequate design.

The plastic resin compositions include elastomeric compositions, rubber and rubber-like compositions as the binder or adhesive or integrating material. The fibrous materials and the metallic materials in balanced design with the plastic compositions and bulk-fillers provide high strength structures and skin-stressed or internally stressed reinforced constructions of exceptional novel properties. Many different plastic compositions are needed and used. Many bulk-fillers and decorative particles are needed and used. Many different metallic wires, rods, bars, screens, woven fabrics, prestressing metals, steels, aluminum, brass, copper, bronze, etc., are required and used.

It is to be understood that it is recognized that although some of the embodiments and examples set forth herein are substantially identical with those given in companion cases covering related but distinct invention, it will be readily understood by those versed in patent law and practice that this is because these practical articles and methods embody several inventions, each or some of which can be used with or without the others, i.e., some of the inventions thus used together may be considered optional or can be replaced by alternatives.

Other objects and advantages of the instant invention will become apparent from a consideration of the following detailed description taken in connection with the accompanying drawings wherein satisfactory embodiments of the invention are shown. However, it is to be understood that the invention is not limited to the details herein disclosed but includes all such variations and modifications as fall within the spirit of the invention.

In the drawngs.

In the parent application disclosure and claims are made for a high strength construction wherein the non-metallic fibers, e.g., fiber glass unidirectional fibers and/or metallic fibers, e.g., prestressing wire, rod or cable are combined into a unitary construction embedded in a body of plastic resin composition.

Referring to the drawings, the reinforcing members are designated 7 and the same comprises a plurality of strands 2, each covered with a plastic resin or plastic resins 21 to form the reinforcing member which is adapted to be bonded to a supporting member, e.g., a concrete block, body or structure, or is adapted in whole or in part to be a self supporting construction adapted for load bearing.

The strands 2 may be single fibers, slivers, roving, unidirectional mat, multi-directional mat, woven or felted fabrics or woven fibers, etc., used alone or in combination with metallic wires and strands. Depending upon each strand type, or fiber type or reinforcing material type, desired strengths and other characteristics necessary for the finished product are available by design or formulation.

The strands 2 comprising the reinforcing members 7 are made of any fiber or metal having the required strength and compatibility. Fiber glass strands, roving, chopped strands, fabrics, unwoven fabrics, mats, woven roving, cloth, or cotton fibers, hemp fibers, burlap, rubber, synthetic fibers, fuzed quartz, fuzed volcanic deposits, and the like, or any combination of them may be used in a woven or combined construction with metallic wires, screen, woven reinforcement, welded fabric metals, perforated metals, sheets, tapes, sleeves, or any other adaptable metal construction. The properties of metal reinforcements are well known and the properties of the various fibers are also well known. Features of fiber glass, a preferred fiber in many constructions but not all constructions, is well disclosed in my copending applications.

Figure 1:
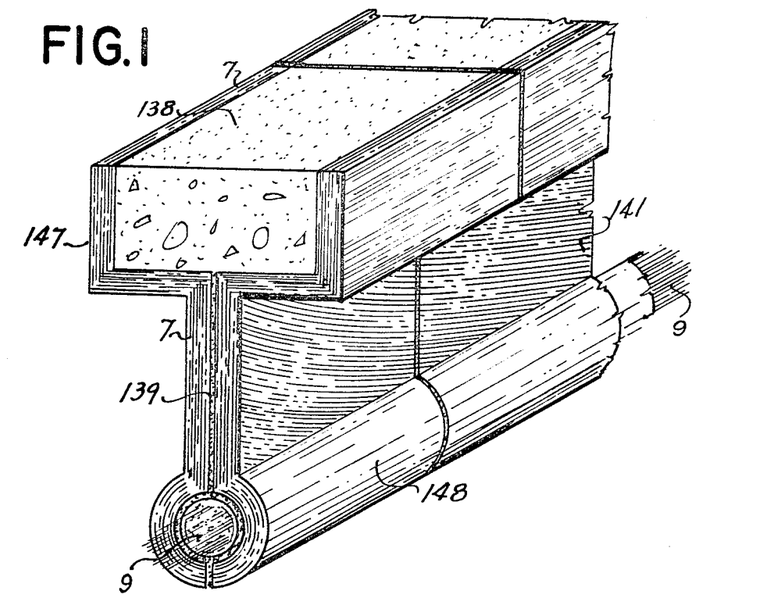
FIGURE 1 shows an isometric section of a beam construction embodiment of the invention.

The wound construction shown in FIGURE 1 provides looped end enlargements and a uniform cross section through the reinforcing laminated layer construction interwoven as shown with the individual strands 7 comprised of wire or in other embodiments of fiber glass or fibrous materials having substantially uniform length. The strands are embedded in plastic resin 21 or in compositions of plastic resins, elastomers and/or rubbers or rubber-like resinous materials. These strands are laid together in non-abrasive relationship, impregnated and coated with plastic resins 21 made from the plastic materials adapted to any individual formulated construction as disclosed herein. The plastic composition may contain a catalyst for accelerating polymerization of the resin at a predetermined temperature. The strands may be of metal or fiber or may be composite assemblies of both metal and fiber interwoven or stranded together. The reinforcing member is compounded and if desired, advantageously preformed, and may be also advantageously preformed and packaged ready for placing, fixing and bonding. The preforms are used in a ready-for-prestressing construction or, in a wholly or partially prestressed constructions or other constructions employing this invention.

I use "strand" in this application broadly to include a single long fiber as well as a porous mass of tensile fibers interlaced or intertwined or woven sufficiently to hold together, and without regard to width or cross-sectional form. I use the word "sliver" to identify a strand (in this broad sense) wherein tensile fibers are oriented generally longitudinal of the strand and sufficiently loosely to be readily penetrated and permeated by flowing resin or resin forming monomer or other elastomer, rubber or rubber-like flowable resinous substance. The word "strand" is used to define any fibrous or metallic material disclosed in this application.

To get the greatest tensile strength, for example, in one embodiment made from an assembly of fiber glass strands, I have the filaments, strands and fibers orientated and aligned so that they may be stressed at a uniform rate, amount or quantity so that maximum tensile values can be derived from all of the fibers in the construction. As disclosed in prior applications, e.g., Serial No. 229,852 and Serial No. 345,084, I make endless stranded cable or belts of reinforcing materials for use alone or in combination, which may be prestressed or used in other ways to achieve uniformity of structural characteristics on a practical commercial basis. By "endless" I mean wound elements of reinforcing comprising a single strand, sliver, roving, yarn, tape, wire, or woven fabric, woven roving, having a tensile embodiment and which is connected by welding, heat sealing, adhesive bonded, mechanically fastened together at ends to form a loop, or as plurality of continuous fibers, wires, or strands, etc., wound around and around to a required number of turns in any "lay," twist, or stretched make-up having a closed circuit and made of metal or non-metallic material.

Mass produced products of this invention are uniform in strength and the strengths of materials in process is protected by components of the assembled constructions. Fiber glass fibers are nominally good for 300,000 p.s.i. and have been known to reach a test result of 5,000,000 p.s.i. in tension. By their very nature of a low shear value, fiber glass fibers require protection in handling if maximum working strengths are to be obtained. Plastic resin compositions, e.g., unsaturated polyester resins or epoxy or epoxy-polysulfide resin compositions, etc., provide this needed protection and make available the very high strengths of the fibers. In this invention, further protection is afforded fiber glass and other non-metallic fibers during the period of manufacture and in transport and handling by metallic embodiments having multi-purposes and by packaging embodiments which keep the material assembly in an organized ready-for-use composition which when cured and polymerized comprises a unitary construction balanced in design. No limitation is intended in the examples given or to the cited uses because this invention provides functional and fundamental structural embodiments useful in many articles of manufacture.

The directional use of metal and fiber reinforcements wherein the best possible structural designed constructions are available in the use of the invention because strengths of fibers, wires, screens, strands, cables, rods, is materially improved because of the metal components and the fiber components, e.g., fiber glass are placed in a state of internal tension by the forces induced during the polymerization reaction of a plastic resin composition, e.g., an epoxy-polyester resin composition or an unsaturated polyester resin composition as the resin composition shrinks, congeals, sets, fixes and shrink-fits into place about the reinforcement. The stressing means includes features and novel means which utilize the substantial and large forces resulting from the chemical reactions of polymerization of thermosetting resins and the like, and the expansion forces of the materials of the laminate whereby the said polymerization reaction chemically induced or heat induced, e.g., the reaction occurring in the setting of e.g., an unsaturated polyester resin composition, are transmitted as the complex stresses of shrinkage in the plastic composittion through the interface bond area of the laminated structure or construction as compressive stress in the surface of the bonded materials.

This can be likened to the same thing as occurs to a wooden wheel when a blacksmith "sweats on" a steel or iron rim and the wheel becomes tightened as the wood of the wheel takes up the prestress stresses induced and introduced by the shrinking of the cooling iron or steel.

The method of manufacturing provides means to chemically prestress structural components. The invention provides prestressing of preloads into the reinforcement of the laminated construction and into constructions of which such laminated constructions are a component, e.g., concrete blocks, slabs, or any other adaptable member designed for loading in tension, compression, sheer or torsion, by the shrinking, condensing, tightening action which introduces prestress preloads into the laminated constructions, concrete materials, masonry materials or any other embodiment as the materials of the lamination undergo setting, cooling, solidification and unification with the preformed or precast concrete components and shapes or other structural members, or articles of manufacture. The heat of the chemical reaction during the polymerization furnishes the heat for the expansion of the wires, e.g., aluminum wires, or stainless steel wires, or woven fabric of metal wires, or other metal reinforcing materials which are covered by and embedded in the plastic resin composition or other plastic composition, which wires or other metal woven mesh or fabric or embodiment are placed under and in a state of internal stress and/or tension when the polymerization reaction is completed and the laminated materials are cooled. Time is a function of the reaction and of the expansion and cooling in any specific formulated construction and the known art of physics and chemistry apply in the calculation of the specific force systems generated and captured in the set and cured plastic resin composition. Metal embodiments are selected in a specific designed construction on the basis of their properties as related to the properties of the fibrous reinforcement and in the calculation of force systems the relationship of the coefficient of expansion of the metal at the temperature of the heat of the reaction of the polymerizable resinous composition and the rate of subsequent cooling of the resinous composition determines the net force system induced into the metal. This likewise holds true for the fibers, e.g., fiber glass, for the filler materials in the resin composition and other components of the laminated layer or composed materials. The coefficient of expansion of fiber glass is generally less than metal, e.g., aluminum or steel so that a relationship of gripping or bond strength can be ascertained as a materials engineering design feature when the plastic resin composition is in its cured state, i.e., is covered around and embeds the metals and fiber reinforcements. The "freeze" or "capture" of the internal stress placed into the metal by the heat can come from a shrinkage of e.g., 2%, 5%, 10% or 7%, said percentages for examples only and not limiting to any plastic composition having its own known shrinkage coefficient. The stresses are considered as tensile stresses in longitudinal reinforcement but complex stresses are present when bond strength and adhesive connection to the metal or fiber by the plastic composition is considered. The gripping action is materials having complex stresses and by the imbalance of coefficients of expansion between metals, fibers and plastic compositions, an engineering resultant is obtained in a stressed construction. These may be called in certain instances "skin-stressed constructions" and in other instances may be called "prestressed preloaded constructions" or "tensioned constructions."

The preformed construction shown in FIGURE 1 comprises a laminated plastic resin impregnated fiber-metal reinforced surface construction layer for lamination to either poured in-situ concrete or for use in laminating to precast concrete elements 1. Reinforcing woven wire mesh together with fiber reinforcement is a useful embodiment. The feature of formability into a bent shape type of formed shape by such a reinforcement 7 makes such a construction adapted to preformed constructions like that of FIGURE 1 in composition materials that may be bonded on-site or in a production line by an adhesive high strength bond 139. A reinforcing cable 9 of fiber glass, polyester fiber, or any other non-metallic fiber, or a steel wire cable, or rods, or aluminum and/or any other metal reinforcing strand, wire, rod, bar or cable may be inserted between the portions 148 and be spaced from the compression resisting portion of the composite member by the adhesively bonded layers comprising the wall 141. The metal gives rigidity to the preformed laminated layers prior to the polymerizing of the plastic resin compositions of the bonding embodiments of the constructions, and when the laminated layers are polymerized and cured comprises a functional or decorative reinforcement of the total construction. In building construction wherein embodiments such as shown in FIGURE 1 are used as joists or beams or members carrying a load, e.g., a floor construction or roof construction load, the metal may be of sufficient strength to provide self support for the composite construcion before polymerization. A woven wire or interwoven wire and fiber glass construction comprises a very convenient embodiment of the invention. In one embodiment, cable 9 may be post-tensioned to a desired prestressed preload and make the final product adapted to structurally engineered supporting beams or girders or may make such a construction a high strength reinforced embodiment of an article of manufacture. The laminated layer of plastic resin composition, e.g., an epoxy-polyester resin composition, or an unsaturated polyester resin composition having a self-extinguishing characteristic, or even a polyvinyl chloride resin composition layered with epoxy polysulphide rubber (Thiokol), or chlorinated polyester resin compositions and/or any compatible combination of such materials can be made to meet building code standards. These standards can be met for both fire proofing, flame spread and load bearing.

In some embodiments the laminated layer of plastic resin fiber-metal reinforcement and decorative structural layer material is provided in a polymerized and cured state for a portion of the construction and is provided in a condition for bonding for that portion of the construction which is laminated to e.g., a porous structural component, e.g., concrete block, at the fact next adjacent the said concrete. The interfacial bond between the preform and the laminated layer may be obtained from a surplus of resin in a thixotropic state at ambient temperature and flowable at elevated temperature over that required to completely impregnate the fiber glass or other fibers and that required to cover and embed the metal reinforcing mesh or wires, said surplus of resin made available by the removal of a packaging sheet or "peel-off" envelope construction as disclosed and claimed in Patent No. 2,671,158. By having the resin in a thixotropic state it does not flow readily and at ambient temperatures or may be designed for flow at specific temperatures and is easily handled on vertical and non-horizontal surfaces. By being of an adhesive type of resin composition, such a resin can adhesively adhere at a portion of an interface or all over an interface so that easy erection of a packaged ready-for-use laminated layered construction, can be done on-site with one input of labor. The adhesive resin composition can be a component of the total resin composition or it may be the resin composition. The predetermined surplus of resin composition advantageously bonds the fiber glass-metal wire reinforcing into tight bonded and integrated structure, particularly when the said resin composition during the polymerization reaction and curing of the resin, flows into the pores and interstices of the porous structural material e.g., concrete and sets in the porous body of said concrete 1 with shrinkage whereby a prestressed skin-stressed laminated construction results.

Figure 2:
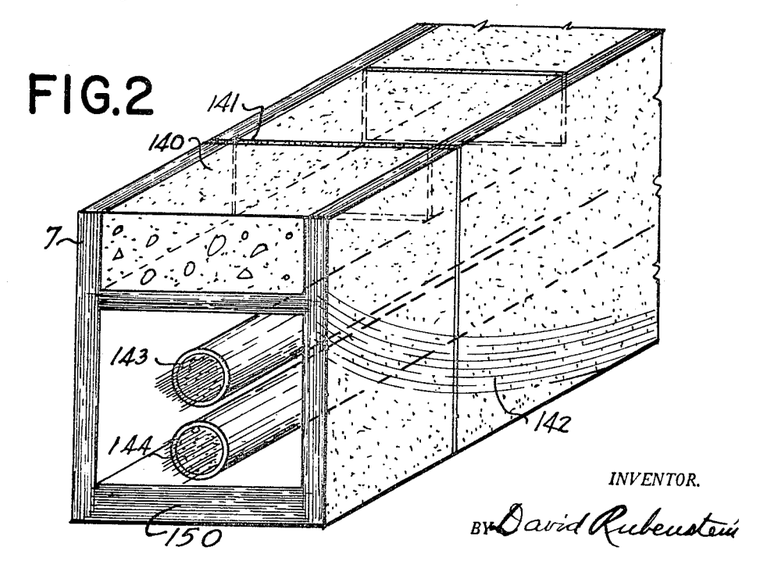
FIGURE 2 shows an isometric view of a section of a beam construction having prestressed longitudinal reinforcement and multi-purpose decorative-structural embodiments of the invention.

FIGURE 2 is an isometric view of a portion of a box-girder type of construction of the invention wherein the preformed laminated layered construction is a self-supporting preformed construction for long span construction or even short span construction adapted to prestressed preloaded embodiments of the invention. The girder or beam-like members are made full span length in their final polymerized plastic resin composition fiber or fiber glass-metal reinforcing embodiment and be able to also support the compression load of compression elements 140. Elements 140 may be precast concrete elements or may be porous structural elements of stone or stone-like material, clay brick, clay tile, or any other masonry material or even may be an expanded concrete or expanded foam polyurethane resin composition, epoxy, or urethane resin having the requisite compressive strength. The elements 140 may be made of "resin-crete," as disclosed in my prior applications a composition of mineral aggregates, e.g., expanded fired clay or shale, or fire expanded Ventura clay or Kansas clay, etc., mixed with a resin composition binder, e.g., an epoxy-polysulphide rubber of a polyester resin composition or a phenolic resin composition or any other desirable or compatible resin, elastomeric or rubber-like composition adapted to a specific design. The elements 140, if precast may be joined together with fiber glass or other fiber plastic resin composition joints.

The prestressing cable may be a fiber glass construction 9 in a cable-like preformed envelope inclosed construction which is advanced between two preformed shaped bodies 147 in FIGURE 1 or is placed in the cell below the compression elements in FIGURE 2. Such a cable is made of polymerizable plastic resin composition embedded and covered over reinforced fibers 7 in their un-polymerized state but sufficiently strong as to be self supporting and having on the faces next adjacent the concrete body 138, sticky bonding resin or other suitable surface. The example provides for maximum use of the strength characteristics of the component tensile and compression members of the construction. The concrete dead load that would be a component part of conventional construction as in a normal conventional beam is reduced in this type of constructions by both the shape of the structure and the maximum use of compressive strength material being used in the upper portion of said beam above its "neutral axis." The concrete material below the "neutral axis" is usually "dead load" and the concrete below the "neutral axis" is used to mainly locate and position the tensile reinforcement. Frequently as much as 80% of the area of a beam below the "neutral axis" contributes little or no value to flexural load carrying ability of the beam and only acts to retain the tension reinforcement in an efficient relationship with the compression part of the member. By thus making the best structural use of both concrete for its compression values and the laminated fiber glass-metal reinforced plastic resin composition laminated bonded layers for their tensile strength, torsion strength and shear strength the embodiment of the invention of FIGURES 1 and 2 provide very high strength beams, girders or components of structures and of articles of manufacture that are much lighter in weight in their final end use as well as in the process of assembly which feature directly contributes to a lower cost product of high quality.

Concrete compression members 138 can be precast—prestressed, prestressed-precast, precast or poured in-situ concrete and placed in assembly with the disclosed members shown herein. The preformed member 147 is susceptible to mass production techniques in multiples of uniform manufacture and can provide decorative-structural components useful in many developments of my invention. The packaged components are directly packaged in films, sheets, or coatings of plastic resin envelopes as well as in paper, fabric, and/or metallic envelopes and the envelopes can be a part of the final end use of the product as manufactured. Further, fibers 7 of either metal or fiber or fiber glass are placed at directions and placements best adapted to specific designs so that multi-purpose reinforcement prevails. In this way shear, torsion, compression and tensile stresses and strains can be efficiently provided for. Also member 148 can be enlarged at the ends or elsewhere to provide necessary restraints and embodiments for prestressed constructions.

The fiber-metal reinforcements may be multi-directional and unidirectional fibers 7 arranged in linear and also in catenary or parabolic arrangement, also cable-like reinforcement 7 may be suitably disposed within the body of the specific embodiment then being made. The hollow cell or large space in the area number 143 made in a balanced designed standardized size and in correlation to a compression component 140, can be made as a mass-produced element or construction adapted to a range of leads for which cable or reinforcement strands, rods, or constructions like FIGURE 1 having end-loop-enlargements may be made to specific sized loads for particular embodiments of the invention. Precast units are bonded together by joinery 141. Parabolic or catenary strands 142a may be disposed in the enveloped laminated construction. End members common to the prestressed concrete beam concept are not shown but any type of members known in the art may be used. While a rectangular and T-shaped construction are shown in the FIGURES 1 and 2, any shaped construction may be made, there being no limitation intended by the examples shown. In certain specific constructions the laminated layered plastic resin composition as reinforced with fiber or fiber glass and metal, e.g., steel, or aluminum or other metal constitutes the complete construction, the masonry component or concrete component being used only in another portion of the construction or not being used at all. Tanks and vessels comprise one type of such embodiment. In confined or underground construction, or in conduit construction, packaged ready-for-use embodiments of the invention may be placed in or pulled into such an environment in a tight, rolled-up package and when inside of the place of use, be inflated by any means, e.g., gas released inside of the envelope of the package or may be inflated by air pressure or chemical release of foam type construction, as blown vinyl or polyurethane resins or diisocyanate foamed materials which is comprised of two alkyds and an isocyanate. When all three of the latter are put together and water is added the materials foam in place.

Floatation embodiments of the invention having superior high strength features made with laminated layered fiber-metal reinforcement are made e.g., by manufacturing an enveloped construction as shown in the parent application in which "sandwich" insulating component may be made of a lightweight, non-rigid expanded product that is based on a styrene-acrylonitrile copolymer combined with a butadiene-1, 3-acrylonitrile copolymer, said plastic resinous materials being known and being used as known in the art.

As shown in my application Serial No. 267,166 a portion of which is now Patent No. 2,671,158 an inflatable construction adapted to being taken aloft by a plane or missile, is made by the features of this invention, and if in space above the atmosphere or in the atmosphere, provide a small volume construction in its unpolymerized state which when inflated or expanded or otherwise made ready, becomes a finished construction upon the actuation of the polymerization reaction and the stressing of the fiber-metal reinforcements makes such a high strength lightweight product. Sunlight or upper atmosphere rays may be the actuating means for polymerization of the resin systems.

Balanced design of metal and fibrous materials, e.g., aluminum wire mesh and fiber glass unidirectional strands or mat, and with or without added multi-directional fiber mat, is a feature of the invention. The plastic resin composition or compositions can make rigid or flexible constructions and provide a discrete amount of stiffness and rigid properties provided to balance and support the metal wires in a state of internal stress. The wires and the fiber glass are enclosed and embedded in the plastic resin composition and protected from adverse environment in adjacent components of any construction. The internal stresses, e.g., a state of internal tension, induced by the shrinkage forces occuring in a polymerization reaction of a thermosetting plastic resin composition could cause failure of the resin composition if an unbalanced force system were set up in the said resin or if an unbalanced force system were set up between the resin composition in its set state and the metal wires embedded in it. The internal stresses which comprise the prestressed preload in the wires originating from temperature which caused expansion in the metal wires could be lost if the internal stress capacity of the resin composition were in unbalanced design with the stresses in the metal. The internal stressing characteristics of the plastic resin composition are controllable, first, by the inherent shrinkage or expansion forces an unmodified resin composition has to offer when it thermosets in a polymerization reaction, and second, by the designed internal stressing characteristic modification of the shrinkage or expansion forces available in a plastic resin composition by combination of resins from which the particular resin composition is made, and third, by the addition of additives of a non-resin composition, e.g., fillers as bulk-fillers or as fiber fillers or reinforcements, so that the resultant force system of prestressed preload is in a state of static equilibrium within the composite structure. If such a force system is not made in a state of equilibrium within the structure or embodiment and is in an unbalanced state, the product may be warped or twisted, or cracked, or improperly stressed components of the construction can cause loss of designed function. The knowledge of the art of my copending applications in the formulation of internally stressed constructions, prestressed preloaded constructions and the like, provides for this invention features of rigid or partly rigid, or flexible, resilient impact resisting constructions, or tough not brittle reinforced plastic resin composition constructions. The preferred prestressed preload provided by the resin composition is substantially in excess of the resistance to bond failure between the metal embedded in said resin composition and to the range of temperatures through which the entire structure must live. Ambient temperatures vary but if the construction is subjected to a fire load and the entire construction is raised in temperature, the stresses within the structure must be of a nature in amount to provide integrity of structure within predetermined limits. For example, a change in temperature over a period of five minutes or any other time selected in which a change from ambient to e.g., 1,000 degrees F. could change internal stresses within a polymerized set construction which would cause it to fail. The resin composition selected for any particular construction not only has to provide in these constructions, a shrinkage or expansion force system to the metal wires etc., comprising reinforcement, but it must also have a flame spread resistance, or fireproofing quality or a rate of ablation consistent with required features of the construction, e.g. fire rating characteristics. The integrity of the prestressed preloaded depends upon balanced design of the internal stress system and its ability to live in a particular environment in conformance with particular predetermined design characteristics and features. These features and the use of said properties is provided by this invention.

The following embodiments of the invention are given by way of example and are not intended to be the limits of the invention in any manner, but are merely to show others the features of some of the uses of the invention and means for making the same:

*Example I*

In the following examples quantities are parts by weight:
The following formulation comprising an unsaturated polyester resin composition is made as follows:

| | Parts |
|---|---|
| Selectron #5003 (Pittsburgh Plate Glass Co.) | 70 |
| Selectron #5208 (Pittsburgh Plate Glass Co.) | 30 |
| | $^1$ 100 |

$^1$ 1814.4 grams.

| | Grams |
|---|---|
| Styrene monomer | 200.0 |
| Luperco ATC (Wallace & Tierman Co.) | 90.0 |
| Selectron #5918 (Pittsburgh Plate Glass Co.) | 90.0 |

This basic mix may be used as above or it may be filled with bulk-filler by adding the following:

| | Grams |
|---|---|
| Calcium carbonate — precipitated — 325–400 mesh | 100 |
| Calcium carbonate—complex—"Perdonyx" | 1134.0 |
| Silica sand—30 mesh crystal silica | 453.6 |
| Ferro yellow pigment | 5.0 |
| American Cyanamid Co. white paste—TiO$_2$ | 15.0 |

The Selectron resins are placed in a mixing vessel, e.g., a Day plastic composition mixer, and blended. The Luperco ATC is mixed with the styrene monomer or a portion thereof, and when blended said Luperco ATC, a benzoyl peroxide catalyst, is added to the Selectron resins for the purpose of catalyzing the resin and styrene monocar mixture.

The reinforcing construction made as shown in FIGURE 1, or 2 may be used wherein for example, strands comprising a plurality of fine wires are woven around shaft onto cores made of heavy fiber glass reinforced constructions or made of pressed paper, metal or any other adapted materials. In between the "lays" of strands 77 and parallel thereto fiber glass roving 75 is woven to a similar "lay" and in a discrete amount. The wires are of any diameter desired, e.g., .063 inch diameter, or .092 inch diameter, but not limited thereto, and woven to form a screen spacing of ½″ center to center of wires, or any other centers. The warp wires and the woof wires in this case are the same gauge but may be of different guges. As the wires are being woven into the screen, fiber glass roving is also woven into the mesh, e.g., 5 rovings of 60 ends, 150's per ½″ space between the woof wires, and if required by the design then being used, one or more rovings may be placed interwoven parallel with the warp wires. Wires of .063 diameter joined into a mesh by weaving may have the following properties: (No limitation of any kind is intended for sizes.)

Mesh space or clear opening—½″; gauge .063 inch diameter; percentage of open area 78.9%; and will weigh per square foot as follows: plain steel—0.45 lb. per sq. ft.; copper—0.51 lb. per sq. ft.; Brass 80–20%—0.50 lb. per sq. ft.; Monel—0.50 lb. per sq. ft. and stainless steel—0.45 lb. per sq. ft.

Aluminum wire may be of discrete gauge and care must be taken to select an alloy and temper which will provide desired fabricating characteristics. In an embodiment of this example the preformed construction was cold formed by cold working the aluminum which was seemingly best done with Reynolds Metals Co. No. 1100–0, or No. 3003–0 or other recommended alloys and tempers for specific uses. No limitation is intended as the art is well known for aluminum products of wire, etc.

The fiber glass roving used in this example was a silane compound sizing now known as Ferro #172 which has the highest rated commercially available strength characteristics for polyester resin applications. Such a silane sized roving has a wet strength retention of 80–95% after a two hour boil or 30 day immersion in water, said wet strength retention being that percentage of wet flexural strength divided by initial dry strength.

Other sizings are available in the art, e.g., Chrome—114, Velan A—139, Heat Cleaned—112, and Silane—1100. Finishes 114, 139 and 100 are suitable for phenolic resins; however, 1100 finish can be used on fiber glass constructions used with melamine resin. Chrome size is recommended for all epoxy and phenolic resins, but the state of the art is in a rapid state of advancement and this is not considered the limits of the art. These recommendations are from Ferro Corp., Nashville 11, Tenn.

A construction like that of FIGURE 1 impregnated, covered and having the wires and fiber glass embedded in the composition comprised of the above formulation without filler and having stainless steel wire of discrete gauge, e.g., .063 inch diameter woven into a composite mesh with the fiber glass roving having finish #172, with the construction under tension from the internal stresses induced by the heat of polymerization of the resin composition and/or by heat from a platen press at e.g., 50 lbs. pressure, but not limited to said 50 lbs. pressure, as no pressure, or other pressures can be used in specific embodiments, provided a very strong prestressed preloaded laminated construction. The stainless steel showed through the translucent resin-fiber glass embodiments and made an attractive pattern. The heat from the polymerization reaction of the resin composition, in this case a reaction times for about 5 minutes at a temperature of 240° F. caused the stainless steel to expand by its known coefficient of expansion of e.g., mean coefficient of thermal expansion in inches/° F.$\times 10^{-6}$; at 68–212° F. for Alleghany Metal Grade 17–7, type No. 301 of 8.0 and at 68 to 1700° F. of $10.6 \times 10^{-6}$. The unsaturated polyester resin composition has a shrinkage value of about 5.8% in volume with the thermal setting appearing in about 3½ to 4 minutes when it locked in the induced stresses into the stainless steel. Without scientific instrumentation this observation may not be exact but the induced stresses are controllable and measurable in specific designs.

The laminated layer was made in a metal pan of standard construction, e.g., 7¾ x 15¾ x ⅜" deep as is used in my concrete embodiments for the concrete block industry. Such a laminated structure set into a metal frame makes a ventilation door in a concrete block wall taking the space of one block, and the same unit provides light through the transluscent fiber glass reinforced unsaturated polyester laminate portions of the construction.

The same fiber glass-stainless steel wire screen reinforced unsaturated polyester resin laminate when applied to a plurality of concrete blocks bonded together formed a large panel whose erection stresses were taken care of by the strengths of the prestressed laminated construction as integrated, bonded to and with the concrete components of the said plurality of concrete blocks.

By making a forming jig out of wood frame or of metal or other material the laminated layered construction as a preimpregnated ready-for-use material was formed into a preformed shape in the jig making the two halves of the elements shown in FIGURE 1. In this case the rigidity of the wire used, a steel wire of discrete ductility, provided a preform on one bonding operation on which held its shape for easy assembly with the concrete elements when the said elements were assembled together in apparatus not shown but disclosed and claimed in my other copending applications. Upon laminating and bonding of the elements together into the beam structure, the polymerization reaction of the thermosetting unsaturated polyester resin composition induced the predetermined preload into the composite construction thus prestressing the steel wire and the reinforcement materials of the embodiment.

When the preform as used in FIGURE 1 is made to match a wall of decorative-structural concrete blocks, I make up the filled resin composition as above disclosed. The bulk-fillers provide an onyx-like stone finish and the metal embodiments are hidden from view and only perform their function of reinforcement and providing easy formability of the preimpregnated laminated layer prior to polymerization. Obviously, many different finishes can be made and the art as disclosed and claimed in my copending applications is used in compatible relationship to and with this invention.

*Example II*

The use of catalysts provides a means of obtaining full cure in a reasonable length of time and in the unsaturated polyester resin compositions peroxide catalysts in their various composite compositions with other materials as known in the art provide commercially practical cures of the resin. Different catalysts e.g., benzoyl peroxide crystals dissolved in styrene monomer for the catalyzation of Selectron #5003 will provide a cure having an exotherm of about 410° F. which reaches its said 410° F. peak in about 4½ minutes, which figure is based on 1% benzoyl peroxide on the resin, whereas 0.5% Lupersol D.D.M., a methyl ethyl ketone peroxide having available about 60% peroxide assay in dimethyl phthalate will cure the resin composition having an exotherm of about 370° F. at its peak but takes about 6.5 minutes to reach this peak. In contrast to these two catalyst systems 0.5% tertiary-butyl hydroperoxide reaches a peak of about 190° F. in twenty minutes. No limitation is intended by these examples, there being other catalysts, e.g., cumene hydroperoxide, benzoyl peroxide compounded with tricresyl phosphate having a 50% benzoyl peroxide assay, or cyclohexanone peroxide compounded with dimethyl phthalate, etc. The more unsaturation a polyester resin contains, the more heat it will give off during polymerization, and the more it will shrink. Balanced design is necessary since the resin shrinks on polymerization, and the rising temperature causes the polymer to extend, thus placing two opposing force systems at work during the cure, if strains and cracks are to be avoided and if the amount of predetermined prestressed preloaded internal stress is to be obtained in the fiber and the metal reinforcement and/or in the concrete if used.

While a few fillers are not inactive, generally the commonly used ones are inactive and do not contribute to the exotherm. As their effect as inert diluents does not affect the exotherm except to dissipate it in rather limited amounts, the greater the ratio of filler to binding resin composition, the faster the cure and polymerization reaction can be without danger of internal stresses being of an intensity that will carry forces to the cracking point of the resin body. By formulated methods of resin-fiber-metal-"bulk-filler" composition as indicated for very simple compositions of unsaturated polyester resin compositions, the induced prestressed preload as e.g., internal tension is provided in these embodiments.

The use of cobalt naphthenate with a hydroperoxide type of catalyst such Lupersol D.D.M. in proportions from 0.006 to 0.12% of cobalt can be used to speed or accelerate gelation of the unsaturated polyester resin at room temperature. The combination of "catalyst systems" is well known in the art and many variations are possible but since environment, mass, and processing vary in specific embodiments, trial and error in view of this knowledge of the art must be a component part of an overall program. Practical considerations in materials handling such as "pot-life" of resin compositions in their catalyzed ready-for-use state determine process in many instances in the modification of designed formulations.

*Example III*

In this example the fiber glass roving having a finish adapted to epoxy resins, e.g., #1100 silane finish, was preimpregnated by running through a dip tank and through squeeze rolls to provide a completely covered roving fiber bundle and cured to a "B"-stage, i.e., partially cured in conformance with the resin. The unsaturated polyester resin composition was a Rohm & Haas Co., Paraplex *P–444 modified with 25% styrene monomer. The roving of fiber glass were interwoven along the warp in a larger amount than along the woof. The fiber glass rovings and mat are placed on one side of the woven wire mesh, e.g., Monel metal wire mesh as in target screens for air craft target practice and the laminated layer binding of unsaturated polyester resin, Paraplex P-444 used to cover and embed the epoxy covered roving and the fiber-metal laminated construction. Being coated on one side of the mesh such a product can be varied in the number of plies in one embodiment in different parts thereof or can be the same number of plies all over. The buildup of resin layers can also be had by curing to a partial state of cure, that is, a state of gelation but not final cure, so that stressing features of the resin compositions may be utilized as disclosed and claimed in my copending applications. Weaving of fiber glass roving, or strands, or tapes, or sleeves, etc., may be along the warp, or along the woof, or laminated to one and not to the other in a great many constructions as required in specific designs. So-called "drum-head" constructions wherein the metal screen provides resistance to stressed fiber glass laminated layers make very light weight constructions of high strength, or resistance may be provided by composite metal and fiber glass sheet constructions. Perforated metal sheets in discrete pattern provide substantially rigid preforms when bent to shape so that fiber glass reinforcement as decorative embodiments may be laminated on the surface of the metal sheet or in specific designs woven through the holes of the pattern, in and out from front to back to provide a stressed member in which the metal perforated sheet comprises a low cost core and the advantageously developed strengths from the fibrous reinforcement provide a novel and high strength structure. The resin system used may be any of the disclosed systems given herein in conformance with the art of resins or as known.

The fiber glass roving having the #1100 silane finish is particularly adapted to epoxy resin compositions and provides very strong laminated constructions.

The disclosure given in Serial No. 743,464 filed June 20, 1958, now U.S. Patent No. 3,111,569, and in prior filed applications on the plastic resin compositions adapted for the inventions disclosed in these said prior applications is also applicable to the instant invention as a companion application for invention. The well disclosed formulations of plastic resin compositions in said Serial No. 743,464 comprise plastic resin formulations as exampled which are useful and used in the present invention divided from the parent applications. The examples from Serial No. 743,464 disclosed therein as Examples I through VIII as a companion disclosure to the instant application comprise examples which when metallic wires, rods, bars, sheets, perforated sheets are utilized with the fibrous constructions and plastic resin formulations of said Serial No. 743,464 comprise the disclosures of the instant invention with respect to the applicable features for use in the embodiments of the instant invention. Because of Patent Office practice as understood by the applicant the instant application contains species of invention which as disclosed in the prior applications of record and in the parent application to this application have not been claimed before or if claimed have been required to be divided from the said prior applications, and, therefore are disclosed again and claimed in the instant application providing the required added language of disclosure found necessary.

It is to be understood that it is recognized that although some of the embodiments and examples as set forth herein are substantially identical with those given in the aforementioned applications and companion cases related to the instant invention but being distinct inventions, it will be understood by those versed in patent law and practice that this is because these practical articles and methods embody several inventions, each or some of which can be used with or without the others, i.e., some of the inventions thus used together may be considered optional or can be replaced by alternatives.

The examples and alternatives given should not be regarded as exhaustive or limiting of the invention but, on the contrary, are given for the purpose of instructing others in the best manner of using and applying the invention and so far as to explain and illustrate the principles thereof that others will be enabled to use the invention in many modifications and various embodiments each as may best be adapted to the requirements of a particular use.

The foregoing description of this invention is for the purpose of illustration only and there is no intention of limiting the scope of the invention which is set forth in the claims, wherein

I claim:

1. An article of manufacture comprising a preformed plastic element having two spaced apart vertical webs and a horizontal bottom web interconnecing the said two vertical webs, said element also having a horizontal upper web spaced vertically from said bottom web, a compression resistant material disposed between the upper portions of said vertical webs and resting on said horizontal upper web, said vertical and horizontal webs comprising a resinous composition covering with a fibrous-metal reinforcement disposed in said vertical and horizontal bottom webs, said bottom and upper horizontal webs and portions of said vertical webs defining an enclosed space and tensile load resisting member disposed in said space.

2. A linear support structure comprising a porous compression load resistant structural material component, said component encased on at least three sides by a resinous-metal-fibrous reinforced covering, a web depending said covering and at least one tensile load resisting linear reinforcing means disposed in said web spaced from and opposite said compression load resistant component.

3. An article as in claim 1 in which said compression resistant material comprises precast concrete body.

4. An article as in claim 1 in which said resinous composition comprises unsaturated polyester resin composition having a polymerization-reaction-induced-captured-shrinkage-stress of about 4%.

5. An article as in claim 1 in which said metal reinforcement comprises aluminum wire.

6. An article as in claim 1 in which said fibrous material comprises glass fibers.

7. An article as in claim 1 in which said tensile load resisting member comprises a linearly disposed plurality of unidirectional glass fibers.

8. An article as in claim 1 in which said resinous composition has a polymerization-reaction-induced-captured-shrinkage-stress greater than said metal expansion-heat-induced-stress captured in said metal component during said polymerization reaction and resultant curing of said resinous composition.

9. An article as in claim 1 in which said resinous composition is a thermosetting polymeric resin composition selected from the group consisting of unsaturated polyester resins, polysulfide rubber resins, polyamine resins, silicone resins, epoxy resins having a curing agent therefor, and polyurethane resins.

10. A linear support structure as in claim 2 in which said tensile load resisting linear reinforcing means comprises a plurality of glass fibers enclosing stainless steel wires bonded together by resilient polymeric resin composition.

11. A linear support structure as in claim 2 in which said tensile load resisting linear reinforcing means exists in a state of prestressed preload in balanced designed load with said porous compression load resistant structural material capable of both resisting static loads and dynamically momentary applied loads.

12. A linear support structure as in claim 2 in which said resinous-metal-fibrous-reinforced covering comprises a woven construction wherein the tensile reinforcement is metallic material and the said metallic material being selected for combination with fibrous materials selected from the group consisting of glass fibers, nylon fibers, polyester fibers, and acrylic fibers, said metallic material and said fibrous materials being bonded together to and with said porous structural material at engineered points of contact required to provide said structure.

13. A linear support structure as in claim 2 in which said compression load resistant structural material component is a precast concrete structure.

14. A linear support structure as in claim 2 in which said compression load resistant structural material component is resin bound mineral particles.

References Cited by the Examiner

UNITED STATES PATENTS 2,377,335  6/1945  Finlayson ____________ 52—309
3,003,290  10/1961 Lerner ______________ 52—724

FRANK L. ABBOTT, *Primary Examiner.*

J. E. MURTAGH, *Assistant Examiner.*